United States Patent Office 2,732,389
Patented Jan. 24, 1956

2,732,389

1-METHYL-2-CARBOXY-7-OXY DERIVATIVES OF HYDROPHENANTHRENES AND PROCESS

John A. Hogg, Kalamazoo, Mich., assignor to The Upjohn Company, Kalamazoo, Mich., a corporation of Michigan No Drawing. Application October 18, 1951,
Serial No. 251,990

15 Claims. (Cl. 260—473)

The present invention relates to novel organic compounds and to a method for the preparation thereof. More specifically, this invention relates to 1-alkyl-2,7-substituted-hydrophenanthrenes and to a method for the preparation thereof. The present invention is a continuation-in-part of my prior-filed copending application Serial 774,171, filed September 15, 1947, now United States Patent No. 2,582,252.

The compounds of the present invention are valuable intermediates in the preparation of more complex organic molecules, such as compounds having an angular methyl group, which are highly active estrogens. In addition, the compounds are useful as resin modifiers and certain of the novel compounds exhibit pharmacological activity per se.

It is an object of the present invention to provide a novel group of organic compounds. A further object of the invention is the provision of a process for the production of the said novel compounds. Additional objects will become apparent to one skilled in the art to which this invention pertains.

The compounds of the present invention may be represented by the following general formula:

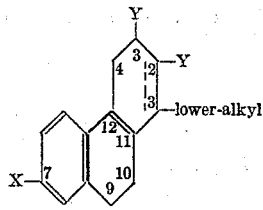

wherein X is selected from methoxy and hydroxy; wherein Y is selected from hydrogen and lower-alkyl; Z is selected from carboxy and carbalkoxy; and the dotted line represents one bond of a double bond which may be present in the one position of the phenanthrene nucleus. The term "lower-alkyl," as used herein, is intended to include methyl, ethyl, propyl, isopropyl, butyl, amyl, hexyl, heptyl, octyl, and like alkyl radicals. When the group in the two position is the carbalkoxy group, such group includes, for example, the carbomethoxy, carbethoxy, carbopropoxy, carboisopropoxy, carbobutoxy, carboamyloxy, carbohexoxy, carboheptoxy, carbooctoxy, carbobenzoxy, and the like. Of the alkyl groups in the one position, the methyl group represents the preferred embodiment, although other alkyl groups, such as those mentioned above, are also suitable.

The method of the present invention consists in the cyclization of a 1-alkyl-2-(meta-methoxyphenethyl)-6-carbalkoxycyclohexene-1-one-3 of the formula:

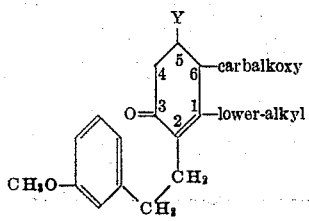

wherein the substituents have the values given previously. These compounds are cyclized by the use of a dehydrating agent, e. g., sulfuric acid, phosphoric acid, $H_2F_2$, a mixture of sulfuric acid and acetic acid, or the like, with concentrated sulfuric acid being preferred. The temperature range for the cyclization reaction is sufficiently low to avoid by-product formation, usually between about minus twenty and plus twenty degrees centigrade, with temperatures below about ten degrees centigrade being most satisfactory. About one-half to two hours is usually allowed as a sufficient reaction period. Upon pouring the cyclodehydration product into water and ice, the 1-alkyl - 2 - carbalkoxy - 7 methoxy - 3,4,9,10 - tetrahydrophenanthrene, which has the formula:

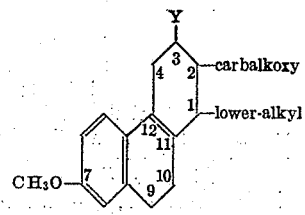

wherein the substituents have the values given previously, usually appears as a gum and may be extracted from the aqueous solution and isolated by removal of solvent. Other conventional methods of isolation may be used, if desired. These esters may be hydrolized, as with ten per cent alcoholic potassium hydroxide, to give the free carboxylic acid, which may, if desired, be reesterified in conventional manner, as with a diazoalkane, e. g., diazomethane, diazoethane, diazobutane, or the like.

Alternatively, the 1-alkyl-2-(meta-methoxyphenethyl)-6-carbalkoxycyclohexene-1-one-3 may be hydrogenated prior to cyclization to a 1-alkyl-2-(meta-methoxyphenethyl)-6-carbalkoxycyclohexanone-3, and the latter compound subjected to the cyclization step. Such procedure is productive of a 1-alkyl-2-carbalkoxy-7-methoxy-1,2,3,-4,9,10-hexahydrophenanthrene compound, having the formula:

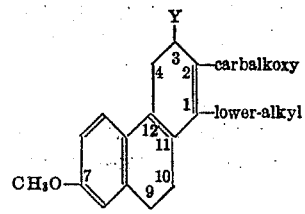

wherein the substituents have the values given previously. The same reaction conditions and separation procedure apply as those given above for the preparation of the tetrahydrophenanthrene compounds. Further purification is usually unnecessary as, upon hydrolysis, preferably with an aqueous alcoholic alkali and neutralization with mineral acid, e. g., sulfuric, hydrochloric, or the like, the free acid is obtained in a solid state and is readily purified by crystallization.

The ester may also be hydrolyzed to the methoxy acid with a dilute base, a 5–10 per cent solution of sodium or potassium hydroxide in 95 per cent ethanol being a representative reagent for this purpose. The free hydroxy acid can also be obtained by the use of hydrogen bromide in acetic acid or by use of pyridine hydrochloride. For some purposes, an ester of the acid is preferred, and esterification of either the methoxy or hydroxy acid may be accomplished using an alcohol and a catalyst such as sulfuric acid or para-toluenesulfonic acid, a dialkylsulfate, or a diazoalkane, e. g., diazomethane. Any catalyst employed, however, should be such as does not add to the aliphatic-type double bond of the molecule.

The resulting ester may be crystallized or distilled to yield a pure product. A lower-alkyl ester, such as methyl, ethyl, propyl, isopropyl, butyl, amyl, hexyl, heptyl, octyl, or the like is preferred, although others are also satisfactory.

The 1-alkyl-2-(meta-methoxyphenethyl)-6-carbalkoxy-cyclohexene-1-one-3 compounds used as starting materials for the method of the present invention are prepared from an appropriate 1-alkyl-6-carbalkoxycyclohexene-1-one-3, of the formula:

(I)

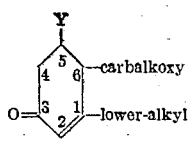

wherein Y is selected from hydrogen and lower-alkyl, lower-alkyl in both instances including methyl, ethyl, propyl, isopropyl, butyl, amyl, hexyl, heptyl, octyl, and the like. Such groups as carbomethoxy, carbethoxy, carbopropoxy, carboisopropoxy, carbobutoxy, carboamyloxy, carbohexoxy, carboheptoxy, carbooctoxy, and the like are included within the scope of the term "carbalkoxy."

These cyclic esters, e. g., 1-methyl-6-carbethoxycyclo-hexene-1-one-3, are prepared by condensation of formaldehyde with an acetoacetic ester, followed by cyclodehydration and subsequent selective decarbalkoxylation using sodium ethoxide. The esterifying group of the acetoacetic ester appears as the alkoxy part of the C-6 carbalkoxy group in such case, and this compound, wherein Y is hydrogen, the C-1 lower-alkyl group is methyl, and the C-6 group is carbethoxy, is known as Hagemann's ester [Berichte 26, 876 (1893)]. The use of an aldehyde other than formaldehyde introduces an additional substituent Y, which is located at carbon atom five of the ring. The structure of the aldehyde used determines the group Y, and this is restricted only by the nature of available aldehydes [Horning, Denekas, and Field, J. Org. Chem. 9, 547 (1944)]. Y, when other than hydrogen, is preferably an alkyl group of eight carbon atoms or less, and may be, for example, methyl, ethyl, propyl, isopropyl, butyl, amyl, hexyl, heptyl, octyl, and the like.

Variation of the C-1 lower-alkyl group may be accomplished according to the procedure of Mannich and Fourneau [Berichte 71, 2090 (1939)]. This involves reaction of a ketone of the formula:

(II)  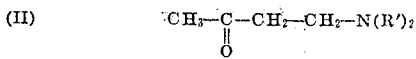

with a beta-keto ester of the formula:

(III)  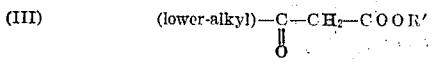

wherein R' is an esterifying radical. The (lower-alkyl) group in the keto-ester III has the values indicated therefor in compound I, and thus, for example, when the lower-alkyl group in compound III is methyl, the C-1 lower-alkyl group in compound I becomes CH₃—.

The Hagemann-type ester (I) bearing the desired substituents is reacted with a meta-substituted phenethyl halide of the formula:

(IV)

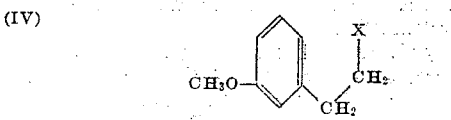

wherein X is a halogen atom, preferably bromine, in the presence of a suitable condensing agent, such as an alkali metal amide or alcoholate. These agents may be, for example, sodamide, sodium hydride, sodium, or potassium, with the latter especially suitable. As medium for the condensation, benzene, xylene, an alcohol such as ethanol or tertiary butanol, and like organic solvents are advantageously employed, with tertiary butanol being preferred. The reactants may be heated together at a temperature between about eighty degrees and about 150 degrees centigrade, usually at the reflux temperature of the particular solvent employed, for a period of about six to fifteen hours. Twelve hours is usually sufficient to allow optimum yields of product. Reaction time will, however, vary with the particular temperature employed and exact nature of the reactants, and shorter or longer periods are sometimes entirely satisfactory. Equimolar proportions of reactants are usually employed. The resulting 1-alkyl-2-(meta-methoxyphenethyl)-6-carbalkoxycyclohexene-1-one-3 compounds are a product of the condensation of the beta-phenethyl halide IV with the 2-position of the cyclohexenone ester I, and may be recovered in conventional manner, e. g., by washing with dilute acid, drying, separating from solvent, and purifying by distillation or the like.

The starting 1-alkyl-2-(meta-methoxyphenethyl)-6-carbalkoxycylohexanone-3 compounds for the method of the present invention are prepared by the catalytic hydrogenation of the 1-alkyl-2-(meta-methoxyphenethyl)-6-carbalkoxycyclohexene-1-one-3 compounds, as with Raney metal, palladium, palladium on charcoal, or like hydrogenation catalysts, with the latter being preferred. While a solvent is not essential, an organic solvent, such as methanol, acetic acid, glacial acetic acid, and especially ethanol may be advantageously employed. The reaction is preferably conducted under a pressure of hydrogen, a hydrogen pressure of about twenty to fifty pounds being suitable. Any suitable temperature between about twenty and eighty degrees centigrade may be employed, with room temperature being entirely satisfactory. The theoretical amount of hydrogen, i. e., one mole, is usually absorbed within a period of about one hour. The compounds thus produced may be separated according to conventional procedure, e. g., as by filtering and removing the solvent, and are usually colorless oils having a fruity odor.

The following examples are given to illustrate the process and products of the present invention, but are in no way to be construed as limiting.

PREPARATION 1.—1-METHYL-2-(M-METHOXYPHENETHYL)-6-CARBETHOXYCYCLOHEXENE-1-ONE-3

Thirteen grams (0.563 mole) of sodium was added portionwise to 250 milliliters of liquid ammonia containing 0.2 gram of hydrated ferric nitrate, with cooling only when necessary to facilitate the speed of addition. The mixture was stirred until the blue color was replaced by gray, whereafter the resulting suspension was cooled in an alcohol-Dry Ice bath, and 102.5 grams (0.563 mole) of Hagemann's ester, 1-methyl-6-carbethoxycyclohexene-1-one-3, was added as rapidly as possible with the continued application of the cooling bath. The deep-red reaction mixture was stirred without cooling for twenty minutes, and was then cooled again while 300 milliliters of dry toluene and fifty milliliters of sodium-dried ether were added. The cooling bath was then removed and the mixture stirred two hours at room temperature until substantially all of the ammonia had escaped. The reaction vessel was then heated to boiling, at which point the sodio-derivative appeared as a yellow precipitate.

One hundred and twenty grams (0.563 mole) of m-methoxyphenethyl bromide was added and the suspension refluxed under a nitrogen atmosphere for eighteen hours. The resulting mixture was washed with dilute hydrochloric acid and then with water. The toluene layer was dried over magnesium sulfate, and the toluene removed under vacuum. After a small forerun, distillation of the residue yielded 102 grams (58 per cent) of the desired product boiling at 180–184 degrees centigrade at 0.3 millimeter of mercury pressure.

*Analysis.*—Calc. for $C_{19}H_{24}O_4$: C, 72.2; H, 7.58. Found: C, 71.6; H, 7.41.

PREPARATION 2.—1,5-DIMETHYL-2-(M-METHOXYPHENETHYL)-6-CARBETHOXYCYCLOHEXENE-1-ONE-3

Five and eight-tenths grams (0.148 mole) of potassium was dissolved in 125 milliliters of anhydrous tertiary butanol and 29.0 grams (0.148 mole) of 1,5-dimethyl-6-carbethoxycyclohexene-1-one-3 was added thereto. After ten minutes, 31.8 grams (0.148 mole) of m-methoxyphenethyl bromide was added and the mixture refluxed under an atmosphere of nitrogen for twelve hours, at the end of which time the solution was neutral. The butanol was then removed under reduced pressure and the residue treated with water and ether. The ether layer was washed with water, dried, and the ether distilled. Final distillation yielded 27.7 grams (56.7 per cent) of the desired 1,5-dimethyl-2-(m-methoxyphenethyl) - 6 - carbethoxycyclohexene-1-one-3, boiling at 178–195 degrees centigrade at 0.3 millimeter of mercury pressure absolute.

PREPARATION 3.—1-METHYL-2-(M-METHOXYPHENETHYL)-5-ISOPROPYL-6-CARBETHOXYCYCLOHEXENE-1-ONE-3

In the same manner as given for Preparation 2, 7.3 grams (0.17 mole) of potassium, 136 milliliters of tertiary butanol, 38.2 grams (0.17 mole) of 1-methyl-5-isopropyl-6-carbethoxycyclohexene-1-one-3, and 36.6 grams (0.17 mole) of m-methoxyphenethyl bromide were refluxed together for a period of about twelve hours and the desired product, 1-methyl-2-(m-methoxyphenethyl)-5-isopropyl-6-carbethoxycyclohexene-1-one-3, boiling at about 188–210 degrees centigrade at 0.3 millimeter of mercury pressure absolute, isolated from the reaction product. The yield of desired compound was fifty per cent of the theoretical.

*Example 1.—1-methyl-2-carboxy-7-methoxy-1,2,3,4,9,10-hexahydrophenanthrene and ethyl ester thereof*

Thirty-three grams (0.104 mole) of the product from Preparation 1, dissolved in 100 milliliters of 95 per cent ethanol, was hydrogenated under 35 pounds pressure using four grams of palladinized charcoal as catalyst. The theoretical amount of hydrogen was absorbed in 45 minutes. After filtration and removal of solvent, there remained 1 - methyl - 2 - (m-methoxyphenethyl)-6-carbethoxycyclohexanone-3, a water-white oil of fruity odor. This oil was cooled to about −20 degrees centigrade in an alcohol-Dry Ice bath, and eighty milliliters of concentrated sulfuric acid which had been similarly cooled was added thereto. The viscous contents of the flask were stirred as the temperature was allowed to rise slowly, with cooling from time to time maintaining the temperature always below about ten degrees centigrade. After twenty minutes of shaking and stirring, the temperature was allowed to rise to twenty degrees centigrade, whereafter the mixture was poured onto a large excess of cracked ice. The total reaction time was thirty minutes. A light-colored gum, 1-methyl-2-carbethoxy - 7 - methoxy - 1,2,3,4,9,10 - hexahydrophenanthrene, separated and was extracted with ether.

The ether was removed and the residue hydrolyzed by refluxing for one hour in 200 milliliters of a six per cent solution of potassium hydroxide in 180 milliliters of 95 per cent ethanol and twenty milliliters of water. The alcohol was then removed under vacuum and diluted with water, the water solution washed with ether and acidified with concentrated hydrochloric acid. The free acid came out as an oil which quickly solidified. There was obtained 18.5 grams (65 per cent) of crude acid, melting at 174–178 degrees centigrade, and two recrystallizations from 95 per cent ethanol raised the melting point to 192–193 degrees centigrade. The overall yield of product was 14.2 grams or fifty per cent of the theoretical.

By the Kahnt-Doisy method, this compound produces the full estrus response in doses of 22.5 gamma.

*Analysis.*—Calc. for $C_{17}H_{20}O_3$: C, 75.0; H, 7.35. Found: C, 75.0; H, 7.25.

*Example 2.—1 - methyl - 2 - carboxy - 7 - hydroxy-1,2,3,4,9,10-hexahydrophenanthrene*

Demethylation of the product of Example 1 with 45 per cent hydrobromic acid yielded an oil, 1-methyl-2-carboxy - 7 - hydroxy - 1,2,3,4,9,10 - hexahydrophenanthrene, which was estrogenically active in doses of twenty gamma.

*Example 3.—1 - methyl - 2 - carbomethoxy - 7 - methoxy-1,2,3,4,9,10-hexahydrophenanthrene*

A solution of 7.5 grams of the product from Example 1 was dissolved in ether and treated with an excess of ethereal diazomethane. The solvent was removed and the residue recrystallized from 95 per cent ethanol to yield 7.3 grams (93 per cent) of 1-methyl-2-carbomethoxy-7-methoxy-1,2,3,4,9,10-hexahydrophenanthrene, which crystallized in plates melting at 107–108 degrees centigrade.

*Analysis.*—Calc. for $C_{18}H_{22}O_3$: C, 75.6; H, 7.68. Found: C, 75.6; H, 7.71.

*Example 4.—1,3 - dimethyl - 2 - carboxy - 7 - methoxy-1,2,3,4,9,10-hexahydrophenanthrene and ethyl ester thereof*

Fifteen and eight-tenths grams (0.0513 mole) of 1,5-dimethyl - 2 - (m-methoxyphenethyl) - 6 - carbethoxycyclohexene-1-one-3 was hydrogenated in ethyl alcohol at forty pounds of hydrogen pressure using palladium on charcoal (1.5 grams of ten per cent palladium on charcoal) as catalyst. When the theoretical amount of hydrogen was absorbed, the catalyst was removed by filtration and the residue, 1,5-dimethyl-2-(m-methoxyphenethyl)-6-carbethoxycyclohexanone-3, after solvent removal, employed without distillation in further operations.

The crude product was cooled to approximately ten degrees centigrade and treated carefully with forty milliliters of concentrated sulfuric acid, the temperature being maintained below about ten degrees centigrade. This operation demanded one-half hour, whereafter the temperature of the reaction mixture was allowed to rise to room temperature for ten minutes and poured on cracked ice. The 1,3-dimethyl-2-carbethoxy-7-methoxy-1,2,3,4,9,10 - hexahydrophenanthrene separated as a gum and was extracted with ether and, after removal of ether, refluxed for 24 hours in alcohol containing four to five equivalents of potassium hydroxide. Alcohol was removed by distillation, the residue diluted with water, and neutral material removed by ether extraction. Acidification of the aqueous layer produced an oil which solidified rapidly and melted below 100 degrees centigrade. Recrystallization of the crude 1,3-dimethyl-2-carboxy - 7 - methoxy - 1,2,3,4,9,10 - hexahydrophenanthrene from ethanol raised the melting point to 173–174.5 degrees centigrade. The yield was thirty per cent.

*Example 5.—1,3 - dimethyl - 2 - carbomethoxy - 7-methoxy-1,2,3,4,9,10-hexahydrophenanthrene*

A suspension of 1.58 grams (0.0055 mole) of the product from Example 4 in ether was treated with an excess of diazomethane in ether. After removal of solvent, the desired compound, melting at 73–76 degrees centigrade after one recrystallization from methanol, was obtained in a seventy per cent yield.

*Example 6.—1 - methyl - 2 - carboxy - 3 - isopropyl - 7-methoxy - 1,2,3,4,9,10 - hexahydrophenanthrene and ethyl ester thereof*

In the same manner as given for Example 4, 24.3 grams of 1 - methyl - 2 - (m - methoxyphenethyl) - 5 - isopropyl-6-carbethoxycyclohexene-1-one-3 was hydrogenated under forty pounds of hydrogen pressure with 2.5 grams of palladium on charcoal catalyst in 100 milliliters of ethanol. The crude 1-methyl-2-(m-methoxyphenethyl)-5-isopropyl-6-carbethoxycyclohexanone was cyclized, without extensive purification, by treatment with 65 milliliters of concentrated sulfuric acid at a temperature below about ten degrees centigrade. Potassium hydroxide (8.75 grams) in 75 milliliters of ethyl alcohol was added to the cyclization product, 1-methyl-2 - carbethoxy - 3 - isopropyl - 7 - methoxy - 1,2,3,4,9,10-hexahydrophenanthrene, the mixture refluxed and the product worked up as in Example 4. The desired compound, after crystallization from methanol, was a white solid melting at about 174 degrees centigrade.

*Example 7.—1 - methyl - 2 - carboxy - 7 - methoxy-3,4,9,10-tetrahydrophenanthrene and ethyl ester thereof*

Thirty milliliters of concentrated sulfuric acid, cooled to near its freezing point, was added to ten grams of product from Preparation 1, cooled in an Erlenmeyer flask to —20 degrees centigrade. The temperature was maintained at or below ten degrees centigrade until the main reaction had ceased, and was then allowed to rise to twenty degrees centigrade as in Examples 1 and 4. The contents of the flask were poured into a beaker of cracked ice, the resulting gum, the 1-methyl-2-carbethoxy-7-methoxy-3,4,9,10-tetrahydrophenanthrene, was extracted with ether, the ether removed, and the residue hydrolyzed in 100 milliliters of ten per cent alcoholic potassium hydroxide. The solvent was removed under reduced pressure, the residue diluted with water and, after one extraction with ether, the aqueous solution acidified with dilute hydrochloric acid. Five grams (58.5 per cent) of a yellow product, which melted at 175–188 degrees centigrade with evolution of carbon dioxide, was obtained. The material was further purified by recrystallization from acetic acid with some loss due to decomposition. The product melts at 192–195 degrees centigrade (decomp.), and is soluble in 95 per cent ethanol with difficulty.

By the Kahnt-Doisy test, this compound, 1-methyl-2-carboxy - 7 - methoxy-3,4,9,10-tetrahydrophenanthrene, is estrogenically active in doses of 56 gamma.

*Analysis.*—Calcd. for $C_{17}H_{18}O_3$: C, 75.6; H, 6.67. Found: C, 75.6; H, 6.67.

*Example 8.—1 methyl-2-carbomethoxy-7-methoxy-3,4,9,- 10-tetrahydrophenanthrene*

The methyl ester, melting at 112–113 degrees centigrade, was obtained by treating the acid with ethereal diazomethane.

*Analysis.*—Calc. for $C_{18}H_{20}O_3$: C, 76.1; H, 7.05. Found: C, 75.3; H, 7.09.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of a 1,2,3,4,9,10-hexahydrophenanthrene compound represented by the following formula:

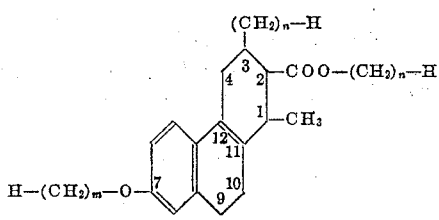

wherein $n$ is a whole number from zero to eight, inclusive, and wherein $m$ is a whole number from zero to one, inclusive, and a 3,4,9,10-tetrahydrophenanthrene represented by the same formula with a $\Delta^{1(2)}$-double bond.

2. A 1,2,3,4,9,10-hexahydrophenanthrene compound represented by the following formula:

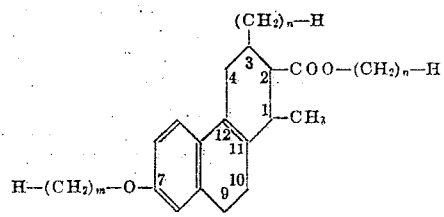

wherein $n$ is a whole number from zero to eight, inclusive, and wherein $m$ is a whole number from zero to one, inclusive.

3. A 3,4,9,10-tetrahydrophenanthrene compound represented by the following formula:

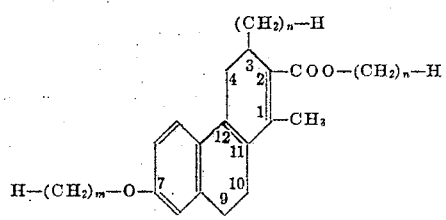

wherein $n$ is a whole number from zero to eight, inclusive, and wherein $m$ is a whole number from zero to one, inclusive.

4. In a process for the production of a compound selected from the group consisting of a 1,2,3,4,9,10-hexahydrophenanthrene compound represented by the following formula:

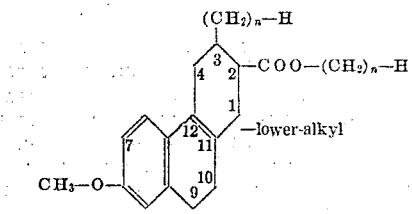

wherein $n$ is a whole number from zero to eight, inclusive, and a 3,4,9,10-tetrahydrophenanthrene compound represented by the same formula with a $\Delta^{1(2)}$-double bond, the step which comprises: cyclizing, by the action of a mineral acid dehydrating agent, a compound selected from the group consisting of a compound represented by the following formula:

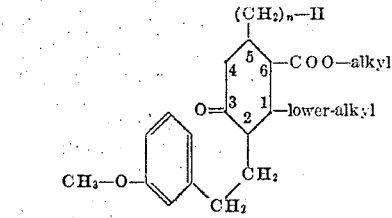

wherein $n$ is a whole number from zero to eight, inclusive, and a $\Delta^{1(2)}$-unsaturated compound otherwise represented by the same formula.

5. In a process for the production of a 1,2,3,4,9,10-tetrahydrophenanthrene compound of the formula:

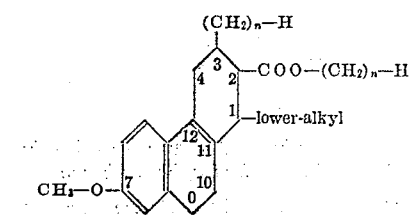

wherein $n$ is a whole number from zero to eight, inclusive, the step which comprises: cyclizing by the action of a mineral acid dehydrating agent, a compound of the formula:

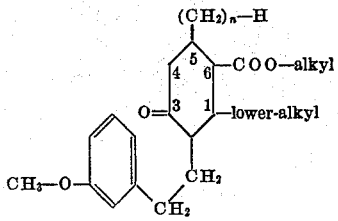

wherein $n$ is a whole number from zero to eight, inclusive.

6. The process of claim 5 wherein the mineral acid dehydrating agent is sulfuric acid.

7. In a process for the production of a 3,4,9,10-tetrahydrophenanthrene compound of the formula:

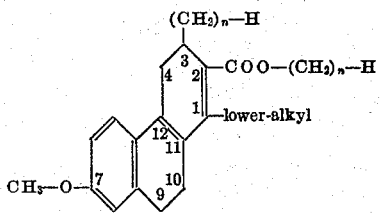

wherein $n$ is a whole number from zero to eight, inclusive, the step which comprises: cyclizing, by the action of a mineral acid dehydrating agent, a compound of the formula:

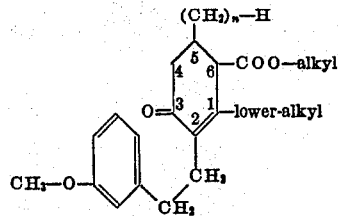

wherein $n$ is a whole number from zero to eight, inclusive.

8. The process of claim 7 wherein the mineral acid dehydrating agent is sulfuric acid.

9. 1 - methyl-2-carboxy-7-methoxy-1,2,3,4,9,10-hexahydrophenanthrene.

10. 1-methyl-2-hydroxy-7-hydroxy-1,2,3,4,9,10-hexahydrophenanthrene.

11. 1 - methyl-2-carbomethoxy-7-methoxy-1,2,3,4,9,10-hexahydrophenanthrene.

12. 1-methyl-2-carboxy-7-methoxy-3,4,9,10-tetrahydrophenanthrene.

13. 1-methyl-2-carbomethoxy-7-methoxy-3,4,9,10-tetrahydrophenanthrene.

14. The process of claim 5, wherein the temperature is below about 20 degrees centigrade.

15. The process of claim 7 wherein the temperature is below about 20 degrees centigrade.

References Cited in the file of this patent

UNITED STATES PATENTS

| 2,459,834 | Miescher et al. | Jan. 25, 1949 |

FOREIGN PATENTS

| 250,806 | Switzerland | July 16, 1948 |
| 258,191 | Switzerland | July 1, 1949 |